United States Patent Office.

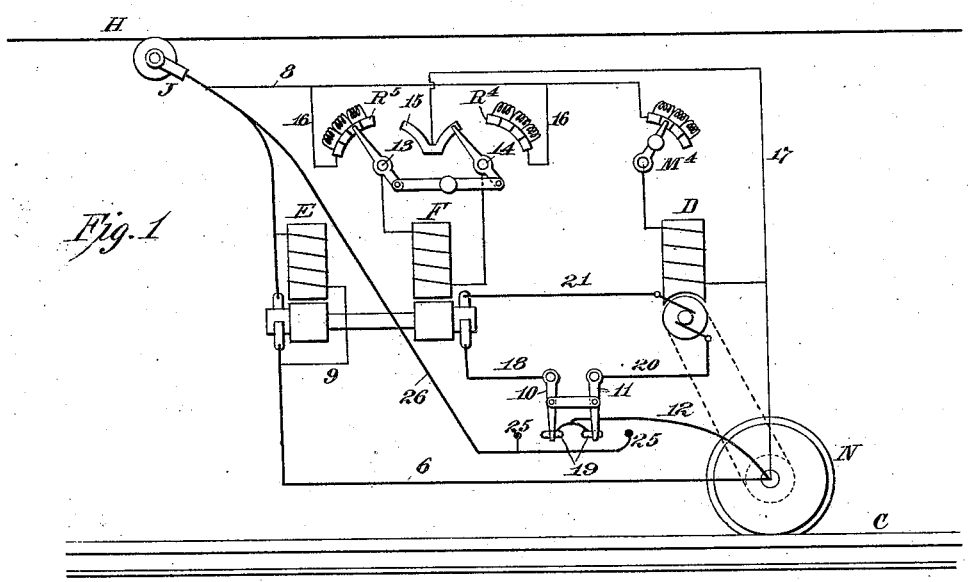

GRANVILLE T. WOODS, OF NEW YORK, N. Y., ASSIGNOR TO H. WARD LEONARD, OF NEW YORK, N. Y.

APPARATUS FOR CONTROLLING ELECTRIC MOTORS OR OTHER ELECTRICAL TRANSLATING DEVICES.

SPECIFICATION forming part of Letters Patent No. 690,810, dated January 7, 1902.

Original application filed March 20, 1895, Serial No. 542,457. Divided and this application filed March 28, 1901. Serial No. 53,213. (No model.)

*To all whom it may concern:*

Be it known that I, GRANVILLE T. WOODS, a citizen of the United States, residing in the borough of Manhattan, city of New York, county and State of New York, have invented certain new and useful Improvements in Apparatus for Controlling Electric Motors or other Electrical Translating Devices, of which the following is a description.

This invention is an improvement over the method of regulation described in my application, Serial No. 444,268, filed August 27, 1892; and my object is to provide a method and means for reversing the electromotive force upon the terminals of the translating device.

The invention consists, broadly, in the method of regulating and controlling electric power apparatus consisting in the employment of an electromotive force in series with the working motor or other translating device, the regulating electromotive force being capable of variation and reversal, so that it shall at pleasure be controlled both in amount and direction and in turn oppose the electromotive force supplied by the line in variable degree or add to it in variable degree. On the mechanical side the invention may be defined as the combination of an electric motor or other translating device and an electromotive-force regulator consisting of a dynamo-electric machine whose armature is in series with the motor or other translating device to be regulated and independent means for varying and reversing the electromotive force generated by the regulating-machine.

The accompanying drawings show two diagrammatic views illustrating my invention applied to the operation of a car and the circuit connections at different stages.

While my invention is shown applied to the operation of a car, it will be understood that I do not limit myself to such application, as my improved method of control may be equally as well applied in the operation of other apparatus.

Referring to Figure 1 of the drawings, H indicates the overhead conductor of an electric railway; C, the rails, which constitute the other side of the main circuit; D, the working motor for driving a car, and E and F two dynamo-electric machines by means of which the electromotive force at the terminals of the working motor is regulated and controlled. The machines D, E, and F are supplied with energy from the conductor H through the trolley J. The field-magnets of the machines D and F are connected in multiple-arc relation across the line, the connection of the field of machine D being from the trolley H, by wire 8, through the coils of rheostat $M^4$, to wire 17, to the rails and the connection of the field of machine F being from the trolley H, by wires 8 and 16, through the coils $R^4$ and $R^5$ of the reversing-rheostat and wire 17 to the rails. The armature of machine E is connected across the line from trolley H to the rails by wire 6, its field being in a shunt-circuit 9 relative to its armature. The armatures of the machines F and D are adapted under certain conditions to be in a local circuit 18 20 21 by means of switch-arms 10 11 and contacts 19 and under other conditions to be connected in series across the line from the trolley H, by wire 26, contact 25 on the left, switch-arm 10, circuit 18, 21, and 20, to switch-arm 11 and a contact 19, to wire 12 and to the rails, or by wire 26, contact 25 on the right, switch-arm 11, circuit 20, 21, and 18 to switch-arm 10 and a contact 19 to wire 12 and to the rails.

With the connections as in Fig. 1 machine E will run as a motor, driving machine F as a generator, which supplies energy to the working motor D. The speed of motor D can be varied by varying the field strength of machine F. By adjusting and reversing the field-rheostat of machine F without changing the position of switch-arms 10 and 11 the working motor can be operated in either direction from rest to one-half its full speed. The reversal of motion is especially smooth with connections as shown in Fig. 1, and when this is of importance the apparatus will preferably be so connected.

The connections of Fig. 1 will not be made where it is usual to operate the working motor at varying speeds from rest to full speed, for the reason that the changes in connections necessary to operate the motor at full speed are not readily obtained from the connections illustrated in Fig. 1. Ordinarily in starting the working motor the connections will be, as shown in Fig. 2, with the arms 13 and 14 of the reversing-rheostat moved to the extreme left and with the full electromotive force of machine F opposed to the line electromotive force. Under these conditions there will be practically no electromotive force upon the terminals of the armature of the working motor. By gradually weakening the field of the machine F the electromotive force at the terminals of the armature of machine D will gradually increase, and when the machine F is producing practically no volts the working motor D will be working at half speed, due to the line electromotive force. If now the field magnetism of F is reversed by throwing the contact-levers 13 and 14 to the right onto the first contact of resistance R⁴, machine F will produce a small electromotive force, which will assist the line electromotive force to drive the working motor, and by gradually strengthening the field of the machine F the speed of the working motor can be increased gradually to full speed. Thus it will be seen that the speed of the working motor will be due to the combined electromotive forces of the main source and machine F and that by this arrangement it will be possible to secure by means of a small current from the source a much larger current through the armature of the working motor or other translating device.

To reverse the direction of rotation of the working motor, the reversing-rheostat is first adjusted so that the full electromotive force of the machine F will oppose the line electromotive force, and hence there will be the minimum or practically no electromotive force upon the terminals of the armature of the working motor. The switch-arms 10 and 11 are then moved toward the right, opening the circuit 26 18 21 20 12, and then the field-switch of machine F is adjusted to bring the field of that machine to zero. The switch-arms 10 and 11 are then moved farther to the right, closing the local circuit 18 21 20 19, and the field-switch is then adjusted so that the current from machine F will drive the working motor D in the desired direction, the speed of which may be increased up to the speed due to the full electromotive force of machine F. When in the middle position, the switch-arms 10 and 11 place the armatures of F and D in a local circuit of low resistance, which will be of benefit in stopping the moving load because of the action of D as a generator generating a large current in this local circuit.

If the working motor is operated with the connections as shown in Fig. 1 and it is desired to increase its speed to full speed, switch-arms 10 and 11 are first moved to the left to the open-circuit position, and then the field of F is adjusted so that it will produce its full electromotive force in opposition to that of the line. The switch-arms 10 11 are then thrown to the left, and the connections will be as in Fig. 2, and then by adjusting the field of machine F as above described the working motor will run at full speed. The rheostat M⁴ in the field of the working motor is provided as an additional means of controlling its speed by varying the strength of the field of D, which will be of value in cases where the torque is low and it is desirable to reach very high speeds.

I do not claim herein the method involved in the operation of the apparatus herein described, since that feature of my invention forms the subject-matter of my original application, Serial No. 542,457, filed March 20, 1895, of which the present application is a division.

What I claim is—

1. In electric power apparatus, the combination of a line, two electrodynamic machines whose armatures are in series with each other, and in electrical communication with the line, and whose fields are in multiple with each other, and means whereby the field of one of said machines can be controlled at will, and its armature be driven at a controlled speed.

2. In combination with a constant-potential electrical generator having conductors leading therefrom and a translating device, a dynamo-electric machine having its armature operating in a variable magnetic field and connected with the said conductors and with the translating device, and switches whereby the said variable magnetic field is controlled and the electromotive force upon the terminals of the translating device reversed.

3. The combination with a source of electric energy, a multiple-arc distribution leading therefrom and across which a translating device is connected, of a transformer of electric energy having two electromotive-force-producing windings, one of which is in series between the source and the translating device and the other of which is in multiple with the translating device, relative to the source.

4. The combination with a source of electric energy, of an armature whose speed is to be regulated connected in series with a regulating-armature, the two armatures being in series under all operative conditions and the regulating-armature being in a reversible field.

5. In electric power apparatus, the combination of a source of electric energy, two dynamo-electric machines whose armatures are in series with each other, and whose fields are in multiple with each other, means whereby the field of one of said machines may be varied and reversed, and means whereby its armature is driven at a practically constant speed.

This specification signed and witnessed this 27th day of March, 1901.

GRANVILLE T. WOODS.

Witnesses:
WILLIAM PELZER,
JNO. R. TAYLOR.